June 8, 1943.  R. V. HEILMAN  2,321,201
WELDED NUT AND PLATE ASSEMBLY AND
PROCESS OF MAKING THE SAME
Filed June 15, 1942
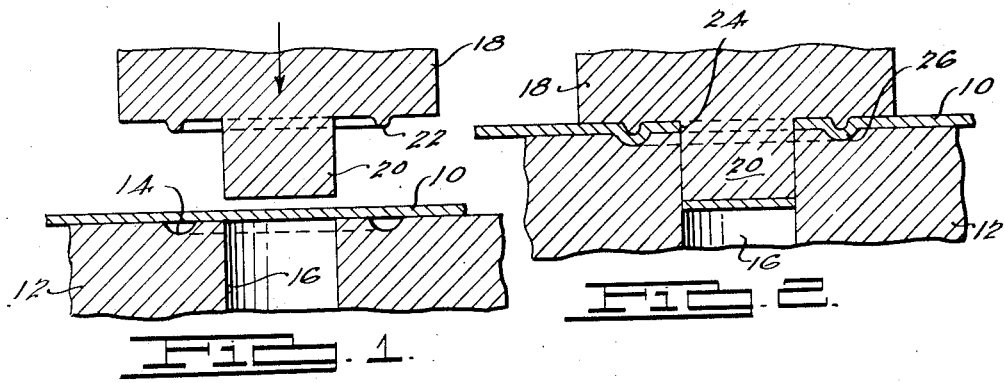
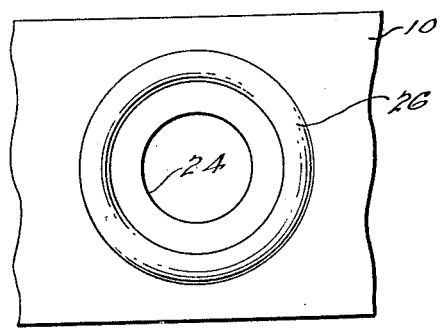
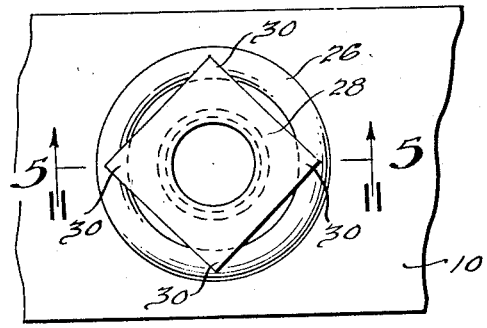
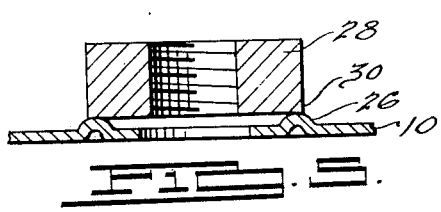
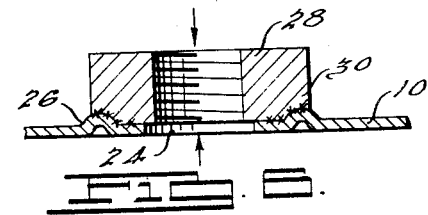
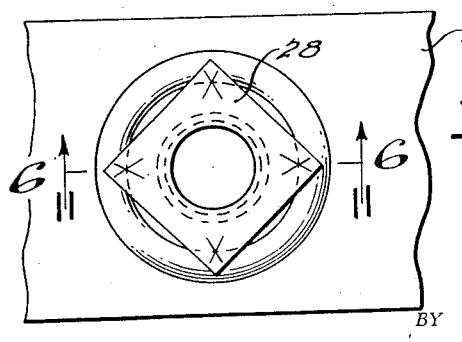
INVENTOR
Ross V. Heilman
BY Edwin J. Balluff
ATTORNEY Patented June 8, 1943

2,321,201

UNITED STATES PATENT OFFICE 2,321,201

WELDED NUT AND PLATE ASSEMBLY AND PROCESS OF MAKING THE SAME

Ross V. Heilman, Detroit, Mich., assignor to Wall Wire Products Company, Plymouth, Mich., a corporation of Michigan Application June 15, 1942, Serial No. 447,182

8 Claims. (Cl. 10—86)

This invention relates to a welded nut and plate assembly and process of making the same.

A principal object of the invention is to provide a welded nut and plate assembly which can be made up without the use of special nuts.

Another object of the invention is to provide a novel and improved form of welded nut and plate assembly.

Another object of the invention is the provision of a new and simplified process of making a welded nut and plate assembly.

Other objects and advantages of the invention will be apparent from a consideration of the following specification taken in conjunction with the accompanying drawing, of which there is one sheet and wherein:

Fig. 1 is a vertical sectional view illustrating portions of two dies and one step in the process of making the welded nut and plate assembly herein disclosed;

Fig. 2 is a view similar to Fig. 1 and illustrating a further step in the process of making the assembly herein disclosed;

Fig. 3 is a bottom view of the plate after formation of the bolt hole and the ridge therein;

Fig. 4 is a plan view of the stamped plate and nut assembled thereto but before welding;

Fig. 5 is a vertical sectional view taken in a plane along the line 5—5 of Fig. 4, looking in the direction of the arrows;

Fig. 6 is a view taken in a plane along the line 6—6 of Fig. 7 and illustrating the relative position of the nut with respect to the plate after welding; and Fig. 7 is a plan view of the nut and plate assembly as illustrated in Fig. 6.

The welded nut and plate assembly herein disclosed may be made according to the following process. A plate 10 of sheet metal is arranged upon a die 12 having an annular channel 14 and a central aperture 16 therein. A male die 18 is adapted to cooperate with the die 12 in order to form the plate, and to this end is provided with a central projection 20 and an annular boss or ridge 22. With the dies arranged in a suitable press and a sheet 10 of metal arranged upon the die 12, the dies 12 and 18 may be brought together in order to blank out a bolt hole 24 in the sheet 10 and to form an annular ridge or offset 26 projecting from one face of the plate 10. In cross section the ridge 26 is rounded.

As illustrated in Fig. 3, the ridge 26 is annular in shape and extends around the bolt hole 24 and is spaced therefrom. A nut 28 is arranged upon the ridge 26 as illustrated in Figs. 4 and 5, the corners 30 of the nut resting upon the ridge 26 but not projecting beyond the outer periphery thereof. Upon the application of heat and pressure to the nut and plate during the welding process, the lower or bottom corners 30 of the nut resting upon the ridge 26 will melt and fuse with the ridge 26 as well as with the part of the surface of the plate 10 inside the ridge 26 and adjacent the corners 30, the bottom surface of the nut 28 during the welding process being moved into engagement with the opposed surface of the plate 10 within the ridge 26. Before the nut 28 is welded to the plate 10, the threaded hole in the nut 28 should be aligned with the bolt hole 24, subject, however, to whatever manufacturing tolerances may be permissible.

The ridge 26 actually forms an offset on the plate 10 within which the nut 28 is seated, and the weld between the nut 28 and the plate 10 extends between not only the nut 28 and the ridge 26 but also between the nut 28 and the surface of the plate 10 within the ridge 26, thereby forming a very effective joint between the plate 10 and the nut 28. This joint, due to the way in which the nut 28 is seated within and on the ridge 26 after welding, has great resistance against shearing and tension stresses.

It will be observed that the nut 28 is an ordinary nut having flat parallel faces normal to the threaded hole therein. It should also be noted that as the ridge 26 is formed by the same die and simultaneously with the formation of the bolt hole in the plate 10, there is no extra cost involved in forming the ridge.

Since the welded nut and plate assembly herein disclosed and the method of making the same require no special nut, as is the case of devices now in use, it is apparent that the article herein disclosed and the process of making the same materially reduces the cost of welded nut and plate assemblies. It is believed that the formation of the offset or ridge 26 in the plate 10 also serves to provide a better joint between the plate and the nut than is provided in the prior art.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

I claim:

1. The method of forming a welded nut and plate assembly to which a bolt is adapted to be secured and in which the thickness of the plate is relatively small as compared with the thickness of the nut, which consists of utilizing dies to form a bolt hole in a plate and a ridge at least partially around and spaced from said bolt hole, seating the corners of a flat face of a nut upon said ridge with the threaded hole in said nut substantially aligned with said bolt hole in said plate, applying heat and pressure to said nut and plate so as to cause said corners of said nut to melt and fuse with said ridge and so as to bring the said face of said nut and the surface of said plate inside said ridge substantially into contact with each other.

2. The method of forming a welded nut and plate assembly to which a bolt is adapted to be secured and in which the thickness of the plate is less than that of the nut, which consists of utilizing dies to form a bolt hole in a plate and an annular ridge around and spaced from said bolt hole, seating the corners of a flat face of a nut upon said annular ridge with the threaded hole in said nut substantially aligned with said bolt hole in said plate, applying heat and pressure to said nut and plate so as to cause said corners of said nut to melt and fuse with said annular ridge and so as to bring the said face of said nut and the surface of said plate inside said ridge substantially into contact with each other.

3. The method of forming a welded nut and plate assembly to which a bolt is adapted to be secured, which consists of utilizing dies to form a bolt hole in a plate and simultaneously therewith a ridge at least partially around and spaced from said bolt hole, seating the corners of a flat face of a nut upon said ridge with the threaded hole in said nut substantially aligned with said bolt hole in said plate, applying heat and pressure to said nut and plate so as to cause said corners of said nut to melt and fuse with said ridge and to said plate inside of said ridge and so as to bring the said face of said nut and the surface of said plate inside of said ridge substantially into contact with each other.

4. A welded nut and plate assembly comprising a relatively thin plate having a bolt hole therein and a ridge projecting from one face of said plate and disposed at least partially around and spaced from said hole, a relatively thick nut having a flat face with the corners thereof welded to said ridge and said nut having said corners deformed during welding and being arranged with the said face thereof substantially in contact with said face of said plate inside of said ridge.

5. A welded nut and plate assembly comprising a plate having a bolt hole therein and a circular ridge projecting from one face of said plate and disposed around and spaced from said hole, a nut having a flat face with the corners thereof welded to said circular ridge and said nut having said corners deformed during welding and being arranged with said face thereof substantially in contact with said face of said plate inside of said circular ridge.

6. A welded nut and plate assembly comprising a plate having a hole therein and a ridge projecting from one face of said plate and spaced from said hole, a nut having a flat face with the corners thereof adjacent said plate welded to said ridge, said ridge forming with said plate a corner into which the nut seats when heat and pressure are applied to the nut during welding, the opposing faces of said nut and plate being in contact with each other inside of said ridge.

7. A welded nut and plate assembly comprising a plate having a bolt hole therein and an annular ridge projecting from one face of said plate and spaced from said hole, a nut welded to said ridge and having its corners deformed during welding so that the opposing faces of said nut and plate are substantially in contact with each other inside of said ridge.

8. A welded nut and plate assembly comprising a plate having a bolt hole therein and an annular ridge projecting from one face of said plate and spaced from said hole, a nut welded to said ridge and to said plate inside of said ridge and having its corners deformed during welding so that the opposing faces of said nut and plate are substantially in contact with each other inside of said ridge.

ROSS V. HEILMAN.